United States Patent [19]

Miller

[11] 4,131,420

[45] Dec. 26, 1978

[54] DRIVE CONNECTION FOR CONVEYOR ROLL

[75] Inventor: Alfred H. Miller, Toledo, Ohio

[73] Assignee: Libbey-Owens-Ford Company, Toledo, Ohio

[21] Appl. No.: 792,905

[22] Filed: May 2, 1977

[51] Int. Cl.² ................. F27B 9/14; B65G 13/06
[52] U.S. Cl. ................. 432/246; 74/413; 198/791; 198/952; 403/359
[58] Field of Search ......... 198/789, 790, 791, 952; 432/246; 214/186 D; 74/413; 403/21, 359

[56] References Cited

U.S. PATENT DOCUMENTS

| 895,621 | 8/1908 | Fawell | 198/791 |
| 1,777,921 | 10/1930 | Hudson | 198/791 |
| 1,885,306 | 11/1932 | Sylvester | 198/791 |
| 2,748,919 | 6/1956 | Britton et al. | 198/791 |
| 3,582,116 | 6/1971 | Young | 403/359 |

Primary Examiner—Evon C. Blunk
Assistant Examiner—Jeffrey V. Nase
Attorney, Agent, or Firm—Collins, Oberlin & Darr

[57] ABSTRACT

A two-piece quick connect-disconnect coupling connecting a conveyor roll to a drive train. The coupling comprises a first section rigidly secured to the conveyor roll and a second section operatively connected to the drive train and a retaining screw detachably connecting the second coupling section to the roll and locking the gears of the first and second coupling sections together in an engaged, intermeshing relation.

11 Claims, 4 Drawing Figures

DRIVE CONNECTION FOR CONVEYOR ROLL

BACKGROUND OF THE INVENTION

The present invention relates generally to conveyor rolls and, more particularly, to a new and useful quick connect-disconnect coupling for a conveyor roll.

In the art of manufacturing glass, it has been customary to employ power rotated rolls to convey glass, whether in ribbon or sheet form, through a furnace for various heat treating operations. Generally, the rolls extend transversely across the furnace with their opposite ends projecting through opposite sidewalls of the furnace. The major intermediate portions of the rolls are confined within the heating chamber of the furnace and consequently are exposed to elevated temperatures and severe service conditions. For example, the rolls are subjected to intense heat for long periods of time, substantial thermal variations, oxidizing and/or reducing atmospheres, warpage, cyclical speed changes and varying load conditions, any one of which may cause roll deterioration and require replacement. Generally, the replacement of one or more faulty or damaged rolls requires furnace cool down and shut down, thereby adding materially to production costs. In addition, roll replacement sometimes damages the support bearings and/or the gear drive mechanism to which they are operatively connected, thereby necessitating other accessory equipment replacement to further increase production costs.

SUMMARY OF THE INVENTION

Accordingly, it is a primary object of the present invention to obviate the above noted shortcomings by providing a new and useful roll mounting structure enabling quick and easy roll removal or replacement without consequent furnace shut down or cool down.

It is a more specific object of this invention to provide a new and improved quick connect-disconnect coupling for a conveyor roll to facilitate roll removal and replacement without interfering with the associated drive train or continuous operation thereof.

It is a further object of the present invention to provide a conveyor roll quick connect-disconnect coupling which is simple and strong in construction, low in cost, rugged and durable in use, and which greatly expedites and facilitates roll removal and/or replacement.

These and other objects, advantages and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
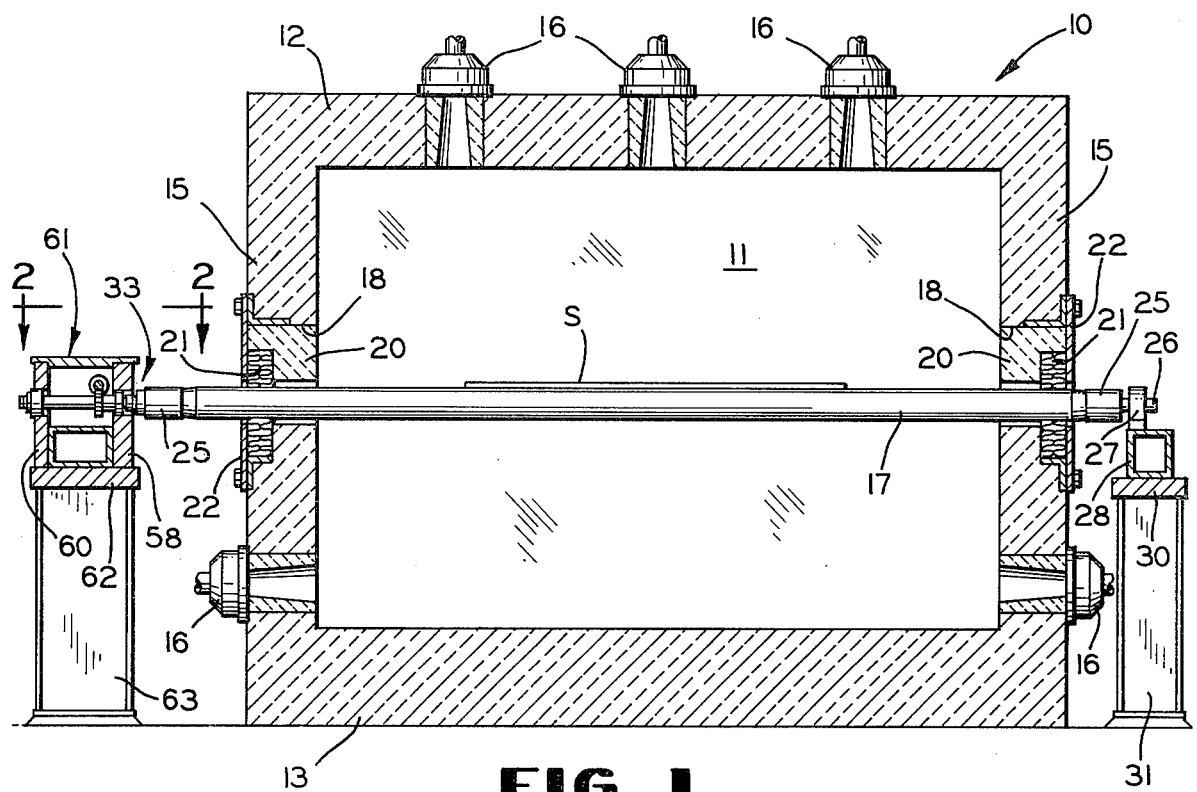
FIG. 1 is a transverse, sectional view of a glass tempering furnace provided with a roll conveyor system embodying the novel features of the present invention.

Referring now in detail to the illustrative embodiment depicted in the accompanying drawings, there is shown in FIG. 1 a conventional glass heat treating, tunnel-type furnace 10 having a heating chamber 11 defined by a top wall 12, a bottom wall 13, and oppposite sidewalls 15, all formed of a suitable refractory material. The chamber 11 can be heated in any desired manner by suitable gas fired or electrical heating elements 16 located in the top wall 12 and the sidewalls 15 of the furnace 10.

A series of conveyor rolls 17 extend transversely of heating chamber 11 and are arranged in a laterally spaced, parallel relation over the entire length of furnace 10. These rolls 17 are power driven for rotation to convey successive sheets of glass S to be heat treated into and through the furnace 10. The opposite ends of rolls 17 project outwardly through and past openings 18 formed in the furnace sidewalls 15. The openings 18 are partially closed by insulating blocks 20 and then completely closed about the roll 17 by a packing 21 formed of a fibrous insulating material in order to retard the flow of heat outwardly of the furnace walls. Blocks 20 and packing 21 are held in place by suitable, removable access plates 22.

While the specific rolls 17 depicted in the illustrative embodiment of this invention are of the solid or bar type, it should be appreciated that the principles of this invention also contemplate the use of hollow tube or cylinder type rolls, if desired. Moreover, the rolls may be formed of a suitable metal such as steel for example, or of a ceramic material such as fused silica or quartz for example. Each of the above type rolls has its advantages, and the particular type of roll employed would be dictated by the specific application. In any event, each opposite end of the roll 17 is provided with a reduced diameter end portion 23 (FIGS. 3 and 4), which is fitted with a cylindrical connecting member or end cap 25 adapted to snugly fit about and encompass such reduced diameter roll end portion 23. The end cap 25 is rigidly secured onto the roll end portion 23 by an adhesive or any other suitable connecting means.

The idle end of each roll 17 exteriorly of furnace 10 is provided with a supporting shaft 26 formed integral with and extending axially outwardly of end cap 25 and journalled for rotation in a bearing block 27 secured to a structural member 28 carried by a plate 30 mounted on the upper ends of upright beams 31 or any other suitable supporting structure. The drive end of each roll 17 is operatively connected to a power driven gear train, generally designated 32 (FIG. 2), by means of a quick connect-disconnect coupling, generally designated 33, constructed in accordance with this invention and which will presently be described in detail.

Figure 3:
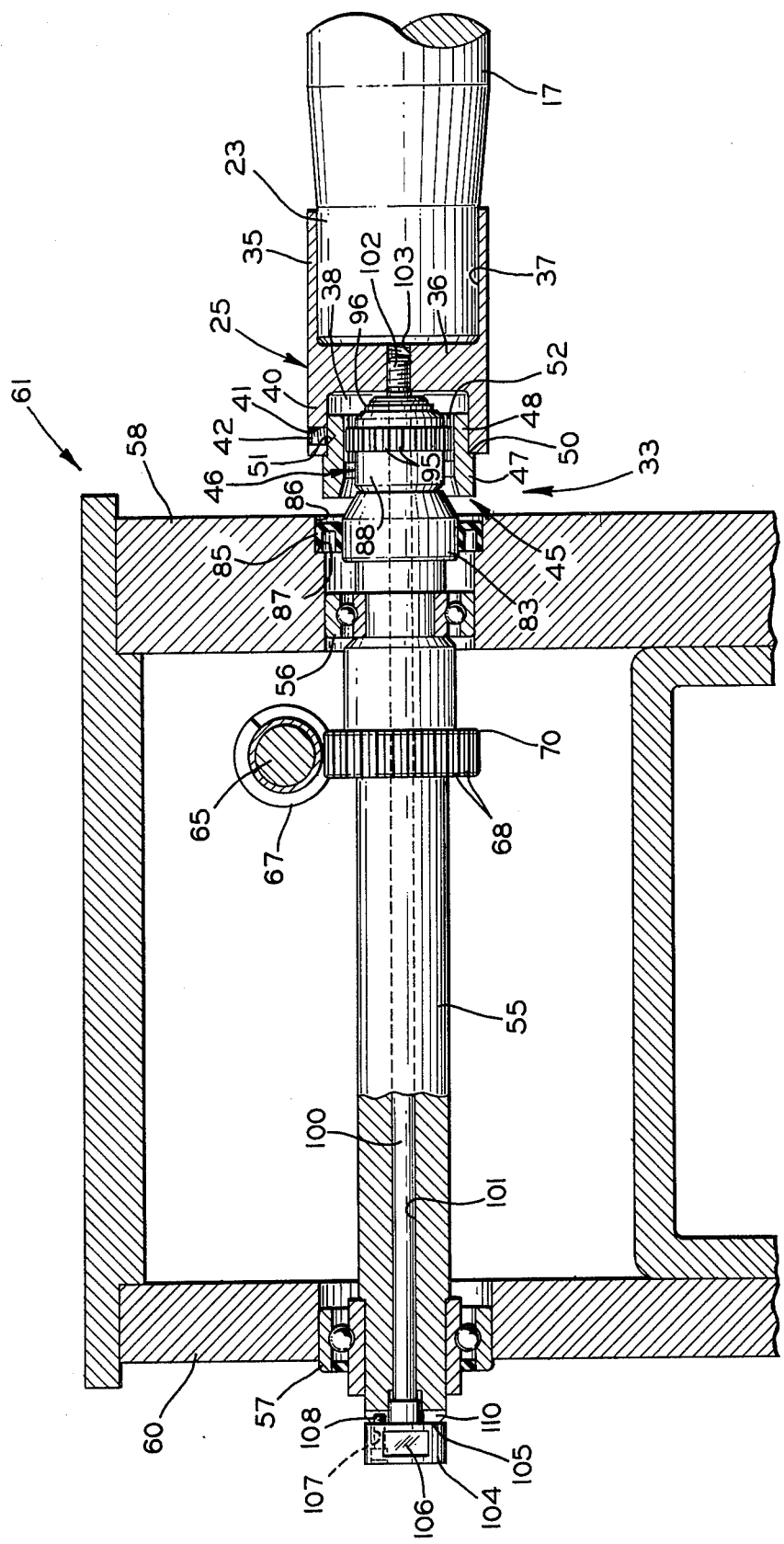
FIG. 3 is a vertical sectional view, on an enlarged scale, taken along the line 3—3 of FIG. 2, showing details of the mechanical coupling constructed in accordance with this invention.
Figure 4:
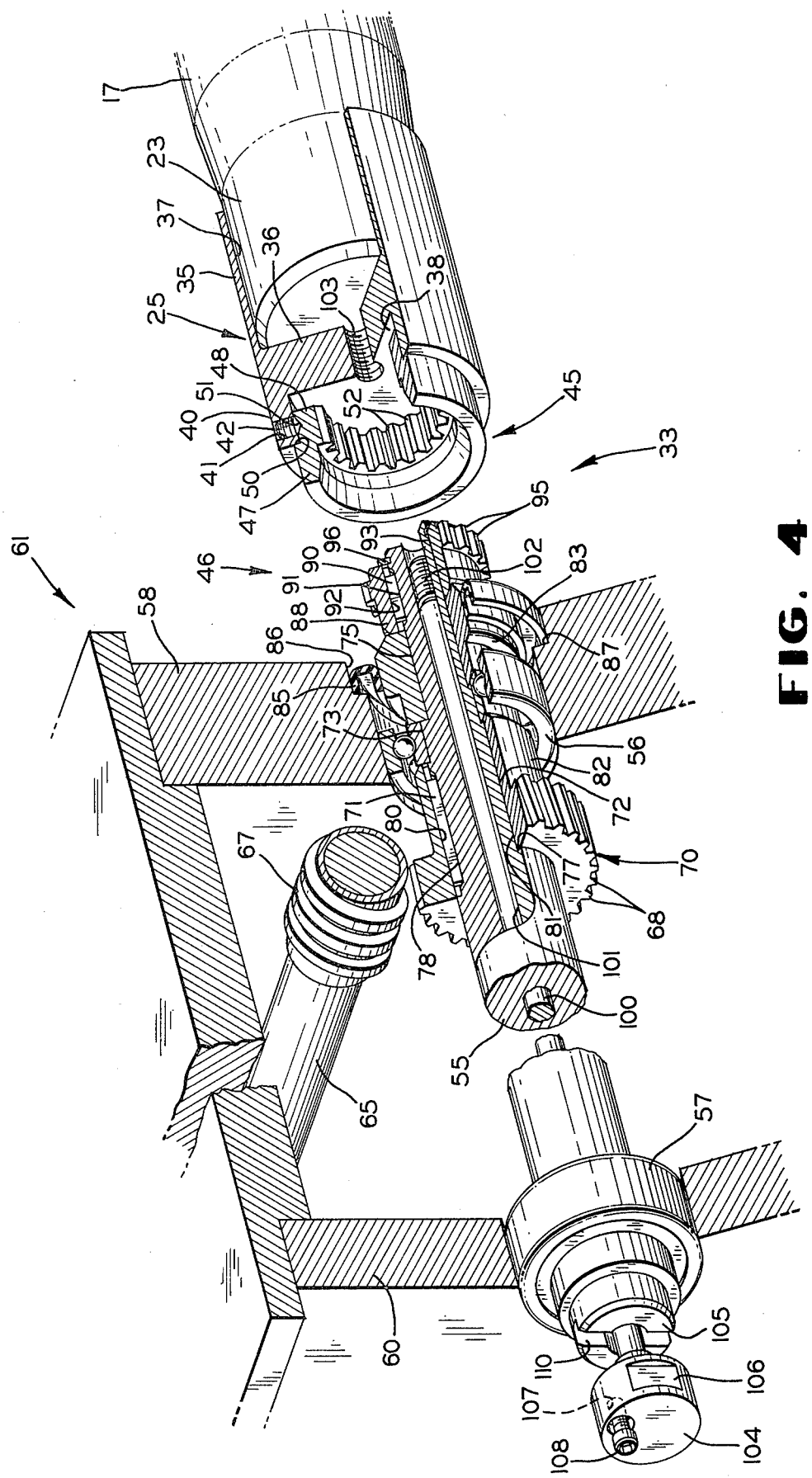
FIG. 4 is a perspective sectional view, showing the coupling of this invention in a disengaged, uncoupled position.

As shown in FIGS. 3 and 4, the end cap 25 of the drive end of roll 17, hereinafter referred to as the "drive end cap," comprises a cylindrical housing or shell 35 having an intermediate internal partition wall 36 defining two cup-shaped cavities 37 and 38, the former receiving and encompassing the reduced end portion 23 of roll 17. The peripheral wall 40 defining the outer cavity 38 is provided with a tapped opening 41 for receiving a set screw 42 to retain a coupling section therein as will presently be described.

The coupling 33 of this invention comprises a composite two-piece assembly including a first coupling section 45 adapted to be secured to drive end cap 25 and a second coupling section 46 operatively connected to the drive train, as will hereinafter become apparent. Coupling section 45 comprises a tubular or hollow body 47 of generally cylindrical outline having a reduced diameter portion 48 separated by an annular shoulder 50. The reduced diameter portion 48 fits snugly within the end cap cavity 38 with shoulder 50 abutting against the end face of the end cap housing wall 40. A series of circumferentially spaced, conically shaped indentations or dimples 51 (only one being shown in FIGS. 3 and 4) are formed in the peripheral surface of reduced diameter portion 48 for selectively aligning one of said indentations 51 with said screw 42 to receive the same and fixedly secure the coupling section 45 to drive end cap 25. Coupling section 45 is formed with internal gear teeth 52 engageable with the external gear teeth of the second coupling section 46 as will presently become apparent.

Figure 2:
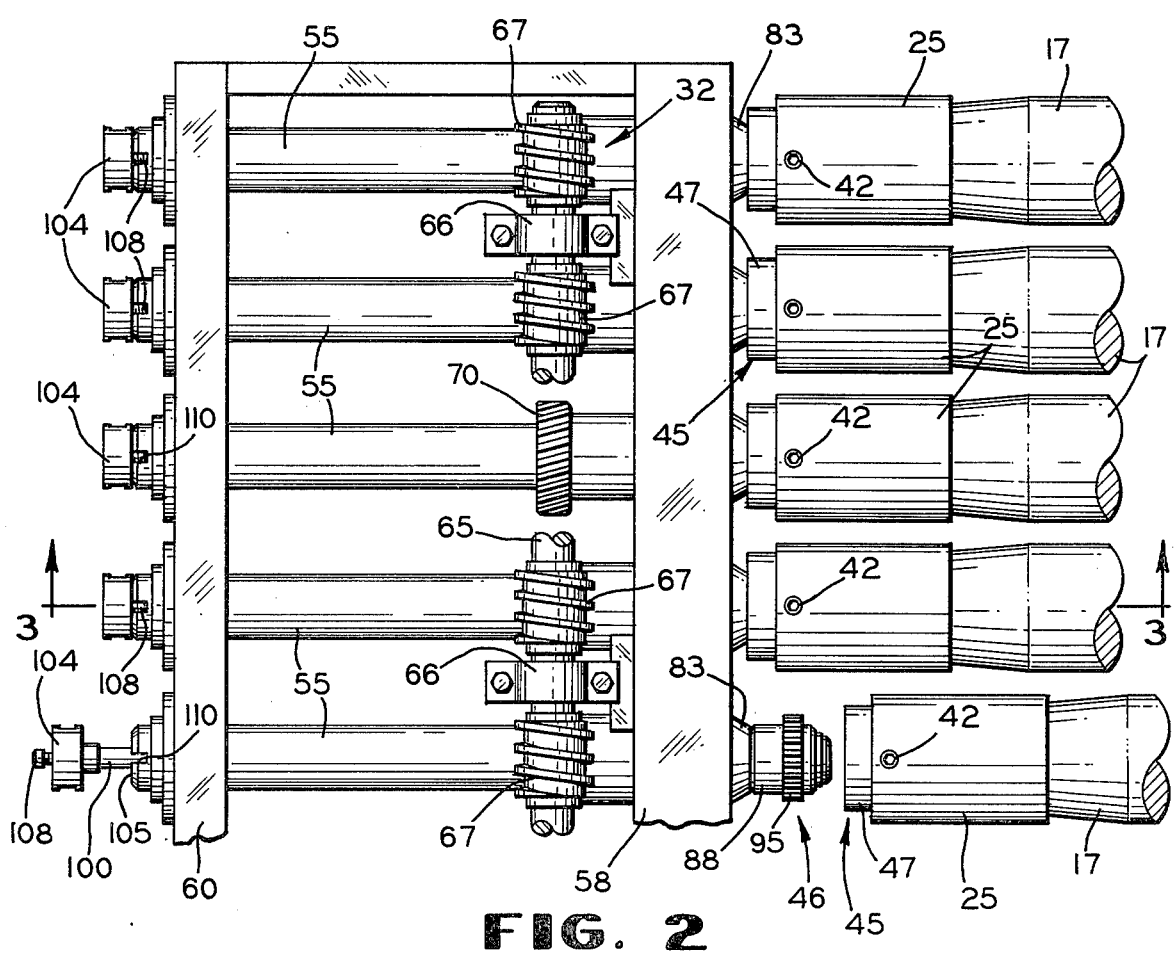
FIG. 2 is a fragmentary top plan view looking in the direction of arrows 2—2 of FIG. 1, showing the drive train and mounting arrangement for a series of laterally spaced conveyor rolls.

Coupling section 46 comprises an elongated tubular drive shaft 55 journalled for rotation in spaced bearings 56 and 57 mounted in a pair of spaced parallel side plates 58 and 60 forming the sidewalls of an elongated housing 61 encasing the drive train 32 for rotating shafts 55. Housing 61 is supported on plates 62 (FIG. 1) mounted on the upper ends of longitudinally spaced vertical pedestals 63 formed of suitable structural members. The drive train 32 includes a shaft 65 operatively connected via suitable gear reduction mechanism (not shown) to an electric motor (also not shown) in a conventional manner for rotating shaft 65. As shown in FIG. 2, the shaft 65 is journalled for rotation in longitudinally spaced bearing blocks 66 mounted within the drive train housing 61. A series of spaced worms 67 are secured to shaft 65 for engagement with the external teeth 68 of worm gears 70 affixed to coupling drive shafts 55, respectively, as by means of keys 71 (FIG. 4).

Each coupling drive shaft 55 is formed with a series of peripheral grooves defining successive annular surfaces 72, 73 and 75 of varying diameters for receiving a plurality of components thereon, respectively. Groove or annular surface 72 receives the worm gear 70 and terminates in an annular shoulder 77 against which the end face of worm gear 70 abuts. Aligned slots 78 and 80 are formed in the annular surface 72 and the inner bearing surface 81 of worm gear 70 to accommodate the key 71. Bearing 56 is mounted on the annular surface 73 adjacent the shank 82 of worm gear 70.

A collar 83 is disposed on the annular surface 75 for supporting an annular sealing element 85 thereabout. The sealing element 85 is in the form of an endless ring of generally U-shaped configuration in cross section and is interposed between the peripheral surface of collar 83 and an annular surface 86 formed in the side plate 58 to provide a fluid-tight seal therebetween. The annular surface 86 terminates in a shoulder 87 against which the sealing element 85 abuts to position the latter in place.

A gear 88 also is mounted on the annular surface 75 and is secured, as by a key 90, to shaft 55 for rotation therewith. Aligned slots 91 and 92 are formed in annular surface 75 and the inner bearing surface 93 of gear 88, respectively, for receiving the key 90. Gear 88 is provided with external teeth 95 for meshing engagement with the internal gear teeth 52 of coupling section 45. A retaining ring 96 is disposed in a suitable peripheral groove formed in shaft 55 adjacent the end thereof for holding gear 88, as well as collar 83, bearing 56, and worm gear 70, in place in an abutting, end-to-end relation on shaft 55.

Means are provided for connecting the drive shaft 55 to conveyor roll end cap 25 and for locking the coupling sections 45 and 46 together against movement in an axial direction relative to each other, such means including an elongated retaining screw 100 extending through a central bore 101 formed in drive shaft 55. The retaining screw 100 has a threaded end portion 102 threadably engaged in a tapped opening 103 formed in end cap partition wall 36 and an enlarged head 104 at the other or outer end thereof adapted to seat against the outer end face 105 of drive shaft 55. The enlarged head 104 can be provided with diametrically opposed flats 106 on the periphery thereof for receiving a wrench or other suitable tool, or the head 104 can be knurled, to facilitate turning of the screw 100.

In order to assure rotational movement of the retaining screw 100 along with drive shaft 55 and to avoid inadvertent unthreading or withdrawal of screw 100 from drive end cap 25, means are provided for locking the screw 100 to drive shaft 55. To this end, the screw head 104 is provided with an internally threaded bore 107 extended therethrough to receive a screw 108 adapted to project into a diametrical slot 110 formed in the end face 105 of screw head 104. This positively locks the head 104 and thereby retaining screw 100 to drive shaft 55 to preclude independent and/or opposite rotational movement therebetween during rotation of the conveyor roll 17.

In operation, with retaining screw 100 threaded into the tapped opening 103, sections 45 and 46 are effectively coupled together for transmitting the rotational movement of drive shaft 55 to its respective roll 17. The retaining screw 100 is operative to connect the roll 17 to coupling 33 and to maintain the teeth of gears 88 and 52 properly intermeshed. When it is desired or required to remove or replace a conveyor roll during furnace operation, access plates 22 together with packing 21 and blocks 20 are removed from openings 18 adjacent the opposite ends of the roll. Screw 108 is then threaded out of the shaft end face slot 110 to disengage the retaining screw 100 from drive shaft 55. Retaining screw 100 can then be threadably disengaged and withdrawn from the threaded opening 103 of drive end cap 25 as shown in FIG. 4 and the bottom left side of FIG. 2. This frees the roll 17, which can be withdrawn axially through openings 18 from the idle end of the roll to slidably retract drive end cap 25 (bottom of FIG. 2) together with coupling section 45 axially off coupling section 46, which remains intact in its original position. It should be noted that the coupling section 46 remains axially fixed during such roll removal and is continuously maintained in driving engagement with the drive train 32. Upon removal, a fresh or repaired conveyor roll can then be expeditiously coupled to drive shaft 55 by reversing the above-described steps.

A significant advantage residing in the coupling 33 of the present invention is that a conveyor roll can be rapidly and expeditiously connected to and/or disconnected from its associated drive train without in any manner disturbing such drive train. A faulty or damaged roll can be removed or replaced on the fly, i.e., while the conveyor system is operating to convey glass sheets in a heat treating operation through a furnace. Moreover, the furnace needn't be cooled down, thereby avoiding interference or interruption with the normal continuous operation thereof. While the quick connect-disconnect coupling 33 of this invention is particularly useful in conveyor rolls employed in conveying glass or other sheet material in heat treating operations because of the special problems encountered therein, it should be understood that coupling 33 is in no matter restricted in use with conveyor rolls employed solely in heated atmospheres such as that shown in FIG. 1 for example, but can be utilized in conjunction with conveyor rolls or any other rotatable members in any application, as desired.

It is to be understood that the form of the invention herewith shown and described is to be taken as an illustrative embodiment of the same, and that various changes in the shape, size and arrangement of parts may be resorted to without departing from the spirit of the invention.

I claim:

1. In a conveyor roll for use in a sheet material supporting and conveying operation including a drive train and means connecting said drive train to said conveyor roll; the improvement wherein said connecting means comprises a coupling having a first section secured to one end of said conveyor roll, a second section having a portion telescopically received within said first section and provided with an axially projecting drive shaft operatively connected to said drive train, internal gear means formed on said first coupling section, external gear means mounted on said second section portion, said gear means engageable with each other for transmitting the torque from said second coupling section to said first coupling section, and a retaining screw detachably connecting said drive shaft to said conveyor roll and locking said gear means of said first and second coupling sections in an engaged, intermeshing relation.

2. A structure according to claim 1, including a cylindrical connecting member encompassing and secured to one end of said conveyor roll, and means releasably connecting said first coupling section to said connecting member.

3. A structure according to claim 1, wherein said retaining screw extends axially through said shaft and is threadably engageable and disengageable with a connecting member attached to one end of said conveyor roll for connecting and disconnecting said shaft to and from said conveyor roll.

4. A structure according to claim 3, including means releasably securing said first coupling section to said connecting member.

5. A structure according to claim 3, including means locking said retaining screw to said shaft.

6. A structure according to claim 5, wherein said locking means comprises an enlarged head formed integral with said screw and engageable with the end of said shaft remote from said telescopic portion, and releasable fastening means securing said enlarged head to said shaft.

7. In apparatus for heat treating sheet material including opposed walls defining a work chamber and a plurality of laterally spaced conveyor rolls spanning said chamber for supporting and conveying sheet material through said work chamber, a drive train located exteriorly of said work chamber, and means connecting said drive train to each of said conveyor rolls; the improvement wherein said connecting means comprises a coupling having a first section secured to one end of a conveyor roll, a second section having a portion telescopically received within said first section and provided with an axially projecting drive shaft operatively connected to said drive train, internal gear means formed on said first coupling section, external gear means mounted on said second section portion, said gear means engageable with each other for transmitting the torque from said second coupling section to said first coupling section, and a retaining screw detachably connecting said drive shaft to said conveyor roll and locking said gear means of said first and second coupling sections in an engaged, intermeshing relation.

8. A structure according to claim 7, including a cylindrical connecting member encompassing and secured to said conveyor roll, and means releasably connecting said first coupling section to said connecting member.

9. A structure according to claim 7, including a connecting member secured to said one end of said conveyor roll and wherein said retaining screw extends axially through said shaft and is threadably engageable with said connecting member.

10. A structure according to claim 9, including means locking said retaining screw to said shaft.

11. A structure according to claim 10, wherein said locking means comprises an enlarged head formed integral with said screw and engageable with the end of said shaft remote from said telescopic portion, and releasable fastening means securing said enlarged head to said shaft.

* * * * *